United States Patent [19]

Pophusen et al.

[11] Patent Number: 5,747,124
[45] Date of Patent: May 5, 1998

[54] POLYAMIDE SAUSAGE CASINGS HAVING IMPROVED SKINNING CHARACTERISTICS

[75] Inventors: Dirk Pophusen, Walsrode; Michael Hennig Cardinal von Widdern, Fallingbostel, both of Germany

[73] Assignee: Wolff Walsrode AG, Walsrode, Germany

[21] Appl. No.: 692,026

[22] Filed: Aug. 2, 1996

[30] Foreign Application Priority Data

Aug. 11, 1995 [DE] Germany ............... 195 29 603.6

[51] Int. Cl.$^6$ ................................. A22C 13/00
[52] U.S. Cl. ............... 428/34.8; 428/910; 264/191.28; 264/209.5; 264/514; 264/515
[58] Field of Search ................. 428/34.8, 910; 264/514, 515, 171.28, 209.5

[56] References Cited

U.S. PATENT DOCUMENTS

| 4,303,711 | 12/1981 | Erk et al. |
| 5,612,104 | 3/1997 | Grund ..................... 428/348 |

FOREIGN PATENT DOCUMENTS

| 0603676 | 6/1994 | European Pat. Off. |
| 0603678 | 6/1994 | European Pat. Off. |
| 0640289 | 3/1995 | European Pat. Off. |
| 0658310 | 6/1995 | European Pat. Off. |
| 2441558 | 6/1980 | France |
| 4339337 | 5/1995 | Germany |

*Primary Examiner*—Patricia A. Short
*Attorney, Agent, or Firm*—Sprung Kramer Schaefer & Briscoe

[57] ABSTRACT

An at least 4-layer co-extruded, biaxially stretched, tubular seamless casing for sausages to be heated in water and cooking-sausages, having improved tearing properties in the filled state associated with a decreased tendency to burst open when the sausage product is first cut, containing at least two layers composed predominantly of aliphatic polyamide, which form the inner and outer surfaces of the tube, and at least two additional layers, which are enclosed by the inner and outer polyamide layers, with at least one of the enclosed layers acting as a water vapor barrier and having the structure of a polyolefin and at least one other of the enclosed layers acting as an oxygen barrier and consisting mainly of ethylene vinyl alcohol copolymers, the quotient of the tear resistance in the transverse direction to the tear resistance in the longitudinal direction lying between about 0.65 and 0.85, with the degree of surface stretching of the film product being between 8 and 11. The process of preparation is also set forth.

18 Claims, No Drawings

POLYAMIDE SAUSAGE CASINGS HAVING IMPROVED SKINNING CHARACTERISTICS

The invention relates to polyamide sausage casings having improved skinning characteristics and in particular a decreased tendency to burst open when the first cut is made into the sausage product.

The present invention provides a tubular seamless multilayer sausage casing consisting of at least two layers containing predominantly polyamide, one layer acting as a water vapor barrier and one layer acting as an oxygen barrier, which casing, owing to its particularly good removability and to the distinctly reduced risk of longitudinal splitting in the filled state, offers definite improvements to the consumer.

The coverings of sausages to be heated in water and cooking-sausages must, as is known, comply with an extensive set of specific requirements in order to meet the standards for use in practice.

These requirements include:
high strength, cylindrical shape, fullness (crease-free fitting)
good skinning behavior
stability at temperatures up to the sterilization temperature
very good barrier properties (reduction of weight losses and lessening of graying in the sausage meat )
high adhesion of the sausage meat
easy removability of the skin, good response to the initial cutting
efficient tightening up of the ends
safety in accordance with the Lebensmittelrecht [Foods Act]/ ecology
reliable adhesion of printing ink.

The casings hitherto known on the market do not satisfy all the items listed in the set of requirements and have definite inadequacies especially as regards the skinning behavior (tear resistance) and response to the initial cutting. When the cooked and cooled sausages are skinned, a ready spiral skinning (peeling off) of the sausage skin is required, with the sausage skin preferably not tearing open longitudinally. The person skilled in the art also refers to this as a spiral striated skinning behavior. Where there is a preliminary incision, the object of skinning is then to remove a strip of even width spirally from the sausage and to expose the sausage in slices. A preferential tearing open of the sausage longitudinally is not acceptable in this case. This skinning behavior is of particular importance especially in brands of sausages of large diameter to be heated in water and cooking-sausages of large diameter, as in many cases these are bisected by an oblique cut and in this form vacuum-packed, so as to enable the customer better to assess the packaged sausage. The achievement of this skinning behavior often conflicts with the desire for a rounded—subjectively regarded as a fresh—sausage.

An explanation of the preferential longitudinal bursting open may be found from a consideration of the mechanics of the process. According to the Kessel formula (formula described in Schnell, Gross, Hanger; Techn. Mechanik Vol. 2, Elastostatik, page 51 ff. in Heidelberger Taschenbücher, Springer Verlag), at a given internal pressure of the sausage meat in the casing, the stress (tension) in the transverse direction is twice as great as the tension in the longitudinal direction. The preferential longitudinal tearing open of conventional wrapping casings is explained by this equation.

The production of a tubular film of this kind is conventionally carried out by the following procedural steps:

1. extrusion, calibration and cooling of the primary tube to be stretched
2. reheating the primary tube to a suitable temperature for stretching
3. biaxial stretching by application of a pressure difference between the internal volume of the tube and the environment around the tube as well as by the longitudinal drawing force promoting the longitudinal stretching
4. heat setting of the biaxially stretched tubular film
5. rolling up and subsequent offline manufacturing steps (tightening up, etc.).

By biaxial stretching, the person skilled in the art means the transverse and longitudinal stretching of the thermoplastic extrudate at temperatures between the glass transition temperature and the melting temperature of the polymeric materials. The biaxial stretching is conventionally carried out by means of a bubble filled with a gas pressure bolster or liquid pressure bolster, which bubble is contained gastight or watertight between two pairs of rollers operating at differing high circumferential velocities. Whereas the ratio of the differing circumferential velocities of the rollers corresponds to the degree of longitudinal stretching, the degree of transverse stretching is calculated from the ratio of the tube diameter in the stretched condition to that of the unstretched primary tube. The stretching ratio represents the quotient of the degree of transverse stretching and the degree of longitudinal stretching; the degree of surface stretching is found from the product of the degree of longitudinal stretching and the degree of transverse stretching.

During stretching the molecules of the tubular film in the solid state become aligned in such a way that the modulus of elasticity and the strengths are considerably increased both transversely and longitudinally.

The strength is adequate when the wrapping casing is mainly elastically deformed during the filling process and during pasteurization or sterilization. The wrapping casing must retain its cylindrical shape in the course of this filling and must not bulge or bend. The sausage casings produced in the prior art are designed to have as isotropic a character as possible. During the filling process the diameter of the casing is stretched elastically by about 2 to 15% owing to the filling pressure, which is normally 1.3 bar but may even be up to 1.6 bar, the extent of stretching depending on the casing material and the filling pressure. The previously isotropic mechanical properties are altered by this subsequent stretching and the associated state of tension in such a way that a longitudinal tearing open can preferentially take place.

The patent literature provides numerous instructions for the processing of partly crystalline, aliphatic polyamide (PA) to form biaxially stretched tubular films. In this connection first and foremost developments of formulations for improved properties in practical use have been published.

DE 28 50 181 mentions that an improved extensibility is achieved by incorporating olefinic copolymers into the PA. According to DE 28 50 181, the tear resistance is improved by using for the production of the sausage casing, instead of the polyamides employed in DE 28 50 182, the glass point whereof is displaced to lower temperatures depending on the water intake, a mixture of polymers comprising these polyamides and modified polyolefins compatible with polyamides, for example, an ionomer resin. Abrupt tearing behavior, which is caused by the varying softness of the phase structures present in the polymer blend, proves to be a disadvantage of these casings.

In the prior art, the simultaneous biaxial stretching of the primary tube takes place in a stretching bubble at the stretching temperatures suitable for the stretching and the tube stretched in this way then undergoes a heat treatment.

As the stretching takes place simultaneously, a controlled stretching preferentially in the transverse or longitudinal direction is possible only to a very limited extent. By inference from the Kessel formula mentioned above, owing to internal pressure the stretching takes place to a greater extent in the peripheral (transverse) direction and the longitudinal stretching is additionally adjusted by the difference in velocity of the drawing rollers. An increase in the drawing velocity of the rollers such that the degree of longitudinal stretching is definitely more than the degree of transverse stretching is possible only to a limited extent, as the stretching bubble is then in danger of bursting.

The object is therefore to develop a polyamide sausage casing which, in addition to the favorable properties of the known polyamide casings given in the introduction herein above, possesses in particular the skinning behavior necessary for use as a casing for sausages to be heated in water. The crucial point of the object is to lessen the risk of longitudinal bursting open of the cooked sausages, for example, when the first cut is made.

According to the invention this serious defect is successfully overcome by the provision of an at least 4-layer coextruded, biaxially stretched, tubular seamless casing for sausages to be heated in water and cooking-sausages, having improved tearing properties in the filled state, associated with a decreased tendency to burst open longitudinally, containing at least two layers composed predominantly of aliphatic polyamide forming the inner and outer surfaces of the tube, and at least two additional layers enclosed by the inner and outer polyamide layers, with at least one of the enclosed layers acting as a water vapor barrier and having the structure of a polyolefin and at least one other of the enclosed layers acting as an oxygen barrier and consisting mainly of ethylene vinyl alcohol copolymers, characterized in that the quotient of the tear resistance in the transverse direction to the tear resistance in the longitudinal direction is between 0.65 and 0.85, with the degree of surface stretching of the film product being between 8 and 11.

A tubular film of this kind is conventionally produced by the double-bubble process, whereby a primary tube extruded through an annular nozzle is cooled and then, after being reheated to the stretching temperature, is stretched simultaneously biaxially in a so-called stretching bubble.

Surprisingly, it has been found that by permitting a high return transverse shrinkage following the first biaxial stretching, the tubular film can be further stretched longitudinally in a second bubble at the temperatures necessary for stretching the solids, so that the total degree of transverse stretching amounts to between 65% and 85% of the total degree of longitudinal stretching, without thereby giving rise to a weakening of the strength of the material, which would then be detrimental to the required cylindrical shape of the finally prepared sausages.

The further longitudinal stretching following the biaxial stretching should be between 1:1.1 and 1:1.5, preferably between 1:1.25 to 1:1.35, and the permitted return transverse shrinkage between the first stretching bubble and the second further stretching bubble should be between 20% and 50%, preferably between 30% and 40%.

Following the stretching and shrinking steps, in a preferred embodiment an associated heat-setting period takes place in order to improve the dimensional stability of the tubular film by heat treatment in one or more steps. The desired shrinkage properties are established by this heat treatment, so that the sausage skin remains largely dimensionally stable under storage and processing conditions. This heat setting can be carried out in a subsequent third bubble as well as directly at the second bubble (further stretching bubble).

It had been expected that the sausage skin, owing to the high transverse shrinkage during the further stretching, would have insufficient strength in the transverse direction, which would result in the finally prepared sausage not retaining the cylindrical shape but in its having a distinct bulge owing to transverse expansion. According to the invention, however, it has been found that as a result of the unconventionally high longitudinal stretching and subsequent heat treatment, dimensional stability of the diameter of the sausage skin is achieved and moreover the risk of longitudinal tearing open is distinctly lowered.

Through the use of a multilayer tubular film of this kind possessing the quotient of the tear resistances in the transverse and longitudinal directions adjusted according to the invention, a casing which satisfies all the requirements specified hereinabove, and in particular exhibits a distinctly improved spiral skinning behaviour, is successfully provided. This results in a more reliable first cut without tearing and consequently the tendency to burst open longitudinally is distinctly decreased. Surprisingly, it has been found that the production of such a tubular film by means of simultaneous biaxial stretching by way of the double bubble process is possible through the further longitudinal stretching of the tubular film in a second bubble, with a return shrinkage in diameter being permitted, without a resulting bursting open of the tubular film under the internal bubble pressure during the production process.

The production of the tubular film according to the invention is carried out preferably by the "double bubble" or "injected bubble" process, whereby the tubular extrudate is first of all transformed into the solid state by intensive cooling and then, in a further stage of the production process, the thick-walled primary tube (300 to 600 µm) thus obtained is reheated to a temperature suitable for the stretching of solids, in order then to be stretched both transversely and longitudinally between two close-fitting pairs of rollers with the inclusion of an air pressure bolster. The reheating can be carried out in one or more steps, for example, by means of hot air, superheated steam, tempered water bath and/or infrared radiators which heat the area all around the primary tube. Following the first stretching step, in a second bubble a specific return shrinkage (reduction in diameter) of the sausage skin, again blown up between two pressing rollers by means of an air pressure bolster, is permitted and simultaneously a further stretching is performed in the longitudinal direction. The diameter of the tube can be controlled by varying the pressure level of the compressed air in the heat-setting process subsequently carried out. By means of heat setting, the target shrinkage values of the sausage skin can be precisely adjusted through the variables of return shrinkage (quotient of the difference between the return diameter/heat-set diameter to the heat-set diameter), heat-setting temperature and residence time. In order to achieve a greater flexibility, the heat setting can be carried out in the presence of water or steam. The biaxially stretched tubular film should be cooled adequately prior to being rolled up, so as to avoid the activation of shrinkage tensions on the roll. The biaxially stretched tubular film is produced in a range of diameters of between 30 and 150 mm, which is standard for sausages to be heated in water and cooking-sausages. In preferred embodiments, the thickness of the coextruded film varies between 35 and 70 micrometres.

The relevant properties of the sausage casings described below are determined by the following technique.

The assessment of the sausages produced encased in the different casings is carried out after the finally prepared sausages have been cooled to cold-storage temperature. In order to produce the sample sausages, the identical standardized sample sausage meat for sausages to be heated in water is used in each case. The filling pressure is specifically adjusted for each sausage casing.

Length of tear

The filled sausage skin (final diameter 65 mm, length 38 cm) is halved axially and a 3 mm lengthwise cut is made into both sides, using a sharp knife. A specific weight is then applied to the clipped ends of the sausages and the length of the initial tear is determined after applying force (and releasing) three times. The measurement is carried out three times and an average value determined. If the individual measured values are within an acceptable standard deviation, the measured value is considered to be reliable and is used as a comparison.

Fullness

Subjective assessment of the strength, the texture and the shape of the ends as an indication of the fullness. The formation of the markings can also be used as an assessment criterion. Establishment of an order of class marks (1=firm texture, very rounded, to 6=soft texture, little rounded).

Removability of the skin

To assess the removability of the skin, the sausage skin was peeled from the sausage starting from an initial cut carried out using a sharp knife. The assessment was made by giving class marks (1=very good removability of the skin to 6=very poor removability). A very good assessment presupposes that the sausage skin can be peeled off in strips (strips of about 3–5 mm width) spirally from the sausage, without sticking or cracking occurring in the course of peeling. If the sausage skin be torn in any direction, it should preferably continue to run transversely (tear) but should not under any circumstances tend to a preferential longitudinal tearing open.

Cylindrical shape

The cylindrical shape, that is, the consistency of the final diameter over the length of the sausage, is measured at intervals of 1 cm over an average sausage length of 38 cm and the standard deviation of the average value is calculated and used for the assessment. The measurement is carried out at about 3 cm from the ends, in order to lessen the influence of the clips.

Tear resistance

Test in accordance with DIN 53363 —tearing test in the transverse and longitudinal direction.

The subject matter of the invention is illustrated in more detail in the following examples.

EXAMPLES

The examples given below were carried out using biaxially stretched tubular films, of 60 mm in diameter. The compositions of the casings coextruded according to the invention and of the casings used in the Comparative Examples from layers consisting of different polymers are abbreviated as follows:

PA Polyamide 6 e.g.: Durethan B 38 F (Bayer AG)
PO Propylene-based copolymer e.g.: Admer QF 551 (Mitsui Chemicals)
XX Ethylene-vinyl alcohol copolymer e.g.: EVAL LC F 101 BZ (Kuraray)
aPA Partly aromatic copolyamide e.g.: Selar PA 3426 (Du Pont)
MB Masterbatch based on polyamide 6 e.g.: Colour masterbatch PA white
AB Antiblocking masterbatch e.g.: PA 6 containing antiblocker

Example 1.1

The following film structure was extruded through a multilayer nozzle to form a primary tube having a diameter of 21 mm:

PA (10 µm) / PO (5 µm) / XX (5 µm) / PA (35 µm)

The primary tube was then simultaneously biaxially stretched at a surface temperature of 90° C. A degree of transverse stretching equal to 3.9 and a degree of longitudinal stretching equal to 2.8 were established. Then, in a second bubble, the tube thus produced was further stretched lengthwise equal to 1.3 at a surface temperature of 110° C., permitting a return transverse shrinkage of about 35%, and was subsequently heat-set in a third bubble. This resulted in a total degree of transverse stretching equal to 2.9 and a total degree of longitudinal stretching equal to 3.6. The stretching ratio RV was established as 78%, the degree of surface stretching was 10.4.

Comparative Example 1.2

The following film structure was extruded through a multilayer nozzle to form a primary tube having a diameter of 19 mm:

PA (10 µm) / PO (5 µm) / XX (5 µm) / PA (35 µm)

The primary tube was then simultaneously biaxially stretched at a surface temperature of 90° C. A degree of transverse stretching equal to 3.5 and a degree of longitudinal stretching equal to 3.0 were established. The tube thus produced was then heat set without further stretching lengthwise and with a permitted return transverse shrinkage of about 10%. This resulted in a total degree of transverse stretching equal to 3.2 and a total degree of longitudinal stretching equal to 3.0. The stretching ratio was established as 105%, the degree of surface stretching was 9.5.

The processing variables established in the following examples, and similarly those in Example 1.1 and Comparative Example 1.2, are summarized in Table 1 below.

Example 2.1

The following film structure was extruded through a multilayer nozzle to form a primary tube having a diameter of 23 mm:

PA+5% AB (15 µm) / PO (4 µm) / PA (15 µm) / XX (4 µm)/ PA+10% MB (35 µm)

Comparative Example 2.2

The following film structure was extruded through a multilayer nozzle to form a primary tube having a diameter of 19 mm:

PA+5% AB (15 µm) / PO (4 µm) / PA (15 µm) / XX (4 µm)/ PA+10% MB (35 µm)

Example 3.1

The following film structure was extruded through a multilayer nozzle to form a primary tube having a diameter of 22 mm:

PA (6 µm) / PO (3 µm) / PA+10% MB+5% aPA (14 µm) / XX (5 µm) / PA (14 µm)

Comparative Example 3.2

The following film structure was extruded through a multilayer nozzle to form a primary tube having a diameter of 19 mm:

PA (6 μm) / PO (3 μm) / PA+10% MB+5% aPA (14 μm) / XX (5 μm) / PA (14 μm)

Example 4.1

The following film structure was extruded through a multilayer nozzle to form a primary tube having a diameter of 22 mm:

PA+5% AB (6 μm) / PO (3 μm) / PA (12 μm) / XX (3 μm) / PA+10% aPA+10% MB (23 μm)

Comparative Example 4.2

The following film structure was extruded through a multilayer nozzle to form a primary tube having a diameter of 18 mm:

PA+5% AB (6 μm) / PO (3 μm) / PA (12 μm) / XX (3 μm) / PA+10% aPA+10% MB (23 μm)

TABLE 1

Table of the processing parameters and test results

| | | Ex: 1.1 | Ex: 1.2 | Ex: 2.1 | Ex: 2.2 | Ex: 3.1 | Ex: 3.2 | Ex: 4.1 | Ex: 4.2 |
|---|---|---|---|---|---|---|---|---|---|
| Primary tube diameter | [mm] | 21 | 19 | 23 | 19 | 22 | 19 | 22 | 18 |
| Stretching bubble diameter | [mm] | 81 | 66 | 86 | 63 | 83 | 64 | 81 | 65 |
| Transverse degree of stretch Stretching bubble | [−] | 3.9 | 3.5 | 3.7 | 3.3 | 3.8 | 3.4 | 3.7 | 3.6 |
| Longitudinal degree of stretch Stretching bubble | [−] | 2.8 | 3.0 | 2.9 | 2.7 | 2.8 | 3.0 | 2.8 | 3.0 |
| Return transverse shrinkage | [%] | 35 | 10 | 41 | 3 | 38 | 7 | 35 | 8 |
| Heat-setting bubble diameter | [mm] | 60 | 60 | 61 | 61 | 60 | 60 | 60 | 60 |
| Further stretching | [−] | 1.3 | 1.0 | 1.3 | 1.0 | 1.3 | 1.1 | 1.3 | 1.0 |
| Total transverse degree of stretch | [−] | 2.9 | 3.2 | 2.7 | 3.2 | 2.7 | 3.2 | 2.7 | 3.3 |
| Total longitudinal degree of stretch | [−] | 3.6 | 3.0 | 3.8 | 2.7 | 3.6 | 3.3 | 3.6 | 3.0 |
| Quotient of the tear resistances (transverse/longitudinal) | [%] | 75 | 105 | 70 | 120 | 75 | 95 | 75 | 110 |
| Degree of surface stretching | [−] | 10.4 | 9.5 | 10.0 | 8.7 | 9.9 | 10.4 | 9.9 | 10.0 |
| Length of tearing open | [mm] | 20 | 90 | 4 | 170 | 15 | 100 | 4 | 120 |
| Removability of skin | [−] | 1 | 4 | 1 | 6 | 1 | 5 | 1 | 5 |
| Cylindrical shape | [−] | 2 | 2 | 1 | 5 | 2 | 2 | 2 | 3 |
| Fullness | [−] | 2 | 2 | 1 | 4 | 2 | 1 | 1 | 3 |

Table 1 sets forth the particulars of each of novel Examples 1.1 to 4.1 alongside each of its Comparative Examples 1.2 to 4.2. In preparation, the samples within each pair differ principally in their Return-transverse shrinkage, the novel samples being much higher. The novel samples exhibit significantly lower Quotients of tear resistances transverse/longitudinal and much higher tearing resistances longitudinally. The novel samples can also be removed from sausages more easily.

It will be understood that the specification and examples are illustrative but not limitative of the present invention and that other embodiments within the spirit and scope of the invention will suggest themselves to those skilled in the art.

We claim:

1. An at least 4-layer coextruded, biaxially stretched, tubular seamless casing for sausages to be heated in water and cooking-sausages, having improved tearing properties in the filled state associated with a decreased tendency to burst open when the sausage product is first cut, comprising at least two layers composed predominantly of aliphatic polyamide, which form the inner and outer surfaces of the tube, and at least two additional layers, which are enclosed by the inner and outer polyamide layers, with at least one of the enclosed layers acting as a water vapour barrier and having the structure of a polyolefin and at least one other of the enclosed layers acting as an oxygen barrier and consisting mainly of ethylene vinyl alcohol copolymers, the quotient of the tear resistance in the transverse direction to the tear resistance in the longitudinal direction lying between about 0.65 and 0.85, the degree of surface stretching of the film product being between about 8 and 11.

2. A casing according to claim 1, wherein the aliphatic polyamide comprises at least one of a linear polyamide (PA) PA 6, PA 66, PA 11, PA 12, a linear copolyamide PA 6.66, PA 6.6, PA 6.8, PA 6.9, PA 6.10, PA 6.11 and PA 6.12.

3. A casing according to claim 1, wherein the layers composed predominantly of aliphatic polyamide also include at least one of an aromatic or partly aromatic polyamide or copolyamide, a polyolefinic polymer or copolymer or polyester or copolyester.

4. A casing according to claim 3, wherein said polyolefinic polymer or copolymer comprises at least one member selected from the group consisting of EVA, EVOH, ionomer resin, acidically modified ethylene copolymer or propylene copolymer.

5. A casing according to claim 3, wherein the outer layer is pigmented by the addition of pigmented masterbatch.

6. A casing according to claim 1, wherein a layer acting as a water vapor barrier comprises a homopolymer or copolymer of at least one of ethylene or propylene.

7. A casing according to claim 1, wherein a layer acting as an oxygen barrier comprises EVOH.

8. A casing according to claim 1, which is cylindrical or bent in the form of a ring or shaped sausage casing.

9. A casing according to claim 1, wherein one or more layer(s) is pigmented by the addition of a pigmented masterbatch.

10. A casing according to claim 1, produced by a simultaneous biaxial stretching by means of a biaxially stretching bubble and by means of subsequent further longitudinal stretching, with a return transverse shrinkage being permitted, both said further longitudinal stretching and said heat setting being carried out in a further stretching bubble or said further longitudinal stretching being carried out in a further stretching bubble and said heating setting being carried out in a separate bubble.

11. A casing according to claim 10, wherein said further longitudinal stretching following the biaxial stretching is between about 1:1.1 and 1:1.5, the permitted return transverse shrinkage between the biaxially stretching bubble and the further stretching bubble is between about 20% and 50%, and the tubular film subsequently undergoes a heat treatment in order to increase dimensional stability.

12. A casing according to claim 11, wherein the further longitudinal stretching is between about 1:1.25 and 1:1.35, and said transverse shrinkage is between about 30% and 40%.

13. A casing according to claim 10, wherein the layers composed predominantly of aliphatic polyamide also include at least one of an aromatic or partly aromatic polyamide or copolyamide, a polyolefinic polymer or copolymer or polyester or copolyester, the layer acting as a water vapor barrier comprising a homopolymer or copolymer of at least one of ethylene or propylene, the layer acting as an oxygen barrier comprising EVOH, one or more layers being pigmented by the addition of pigmented masterbatch, said further longitudinal stretching following the biaxial stretching is between about 1:1.25 and 1:1.35, the permitted return transverse shrinkage between the biaxially stretching bubble and the further stretching bubble is between about 30% and 40%, and the tubular film subsequently undergoes a heat treatment, in order to increase dimensional stability, the sum of all layer thickness of the coextruded casing being from about 40 to 65 μm.

14. A casing according to claim 13, wherein said polyolefinic polymer or copolymer comprises at least one member selected from the group consisting of EVA, EVOH, ionomer resin, acidically modified ethylene copolymer or propylene copolymer.

15. A casing according to claim 1, wherein the sum of all layer thicknesses of the coextruded casing is from about 35 to 70 μm.

16. A casing according to claim 1, wherein the sum of all layer thicknesses of the coextruded casing is from about 40 to 65 μm.

17. A method of producing an at least 4-layer co-extruded, biaxially stretched, tubular seamless tube, comprising co-extruding at least four streams of extrudates to form the tube, each stream forming a layer thereof, bubble stretching the tube, further stretching the tube longitudinally, while permitting possible return transverse shrinkage, and heat setting, the further longitudinal stretching and heat setting being effected in one or two further bubble stretches, the extruded tube comprising at least two layers composed predominantly of aliphatic polyamide, which form the inner and outer surfaces of the tube, and at least two additional layers, which are enclosed by the inner and outer polyamide layers, at least one of the enclosed layers acting as a water vapor barrier and having the structure of a polyolefin and at least one other of the enclosed layers acting as an oxygen barrier and consisting mainly of ethylene vinyl alcohol copolymers, the quotient of the tear resistance in the tansverse direction to the tear resistance in the longitudinal direction lying between about 0.65 and 0.85, the degree of surface stretching of the film product being between about 8 and 11.

18. A tube produced by the process of claim 17.

* * * * *